Figure 1:
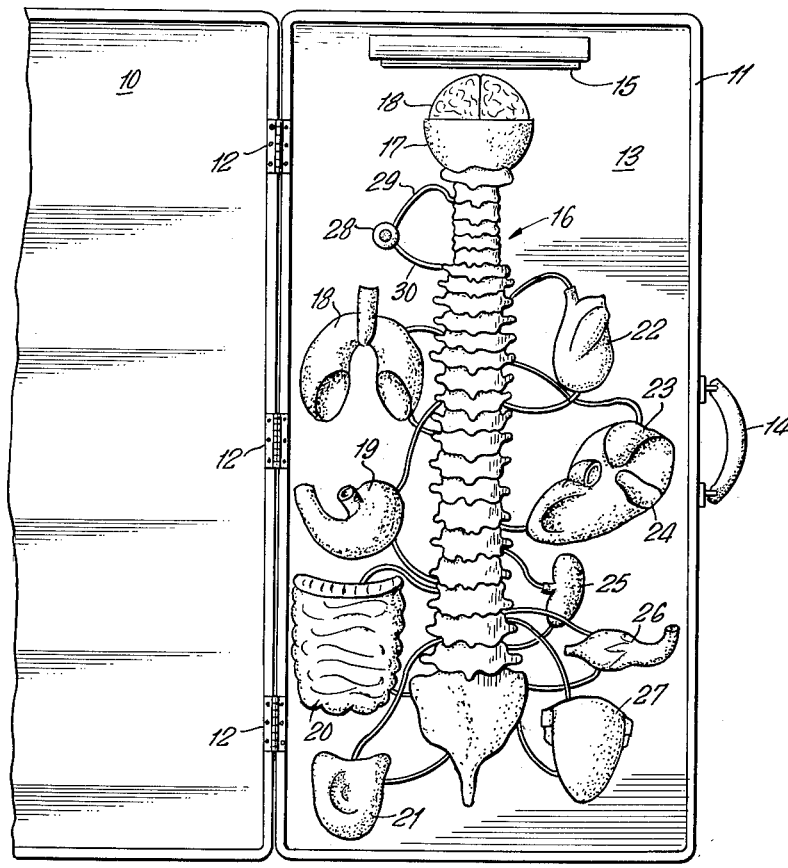

Feb. 13, 1962  N. N. FERRARI ETAL  3,020,652
NEUROLOGICAL MANIKIN
Filed Oct. 25, 1960

INVENTORS
NEAL N. FERRARI
BY DOMINIC N. MENICHELLA

ATTORNEY

United States Patent Office 3,020,652
Patented Feb. 13, 1962

3,020,652
NEUROLOGICAL MANIKIN
Neal N. Ferrari, 29 MacLean Ave., Staten Island, N.Y., and Dominic N. Menichella, Staten Island, N.Y.; said Menichella assignor to said Ferrari
Filed Oct. 25, 1960, Ser. No. 64,910
4 Claims. (Cl. 35—17)

This invention relates to improvements in equipment for providing a visual demonstration of the adverse neurological effects resultant from the dislocation or subluxation of one or more of the vertebrae of the spine. The equipment is for auxiliary use in chiropractic and is advantageous both in connection with lectures and in demonstrating to patients the lowered efficiency of one or more organs of the body due to some particular spinal deformation.

The improvements relate to equipment of the general type which includes a model spinal column composed of parts which may be referred to as model vertebrae. These parts correspond in sundry respects of form and relation to the vertebrae of the natural spine and are capable of individual displacement movement similar to the displacement, i.e., flexing or subluxation, generally corresponding to that which natural vertebrae undergo. This type of equipment also includes models representing particular organs of the body which are severally connected to particular model vertebrae by tubular members symbolic of the neural members found in the body. As is hereinafter more fully set forth, the said neural members or nerves are connected to the spinal column in such a manner that when they are under pressure, tension or deformation as a result of spinal displacement, a lowered efficiency of the particular bodily organ to which they are connected becomes apparent.

In chiropractic, X-ray photographs are taken of the patient's spinal column, thereby to enable the determination of the particular spinal deformation and the certain identification of the particular dislocated vertebra or vertebrae. In the use of the equipment of the general type above described for demonstration to patients, model vertebrae, corresponding generally to the dislocated vertebrae shown by the X-ray photographs, are individually manipulated, i.e., displaced, according to the teaching of the photographs, thereby substantially to symbolize or reproduce the displacement or subluxation of the natural vertebra or vertebrae. Such manipulation of the model vertebra or vertebrae adversely affects the operation of the tubular members and of the model organ or organs connected thereto, the change in such operation being symbolically indicative of the lowered efficiency of the said organ or organs in the human body.

The invention may also be used independently of X-ray photographs for the purpose of providing a more readily understandable visual demonstration of the various adverse effects accompanying displacement of the vertebrae of the natural spinal column.

The principal object of the invention is to provide in substantial degree for greater accuracy and greater comprehensiveness in the demonstration of adverse neurological effects resulting from spinal deformations.

Another object of the invention is to provide a more readily understandable demonstration of the normal functions to be attained from the manipulation of a dislocated or malformed spinal column.

A further object of the invention is to provide for a more readily comprehensive demonstration of the normal neurological functions of the body when the spinal column is disposed in its most desirable position.

A further object of the invention is to provide an anatomical model of the human spinal column, which is functionally associated with models of various major organs of the body and which is provided with symbolic means simulating the neural connections between the spinal column and said organs.

A further object of the invention is to provide an anatomical model of the character indicated which is compact and readily portable.

Other and further objects of the invention will become apparent from the following description as read in connection with the accompanying drawing.

Figure 2:
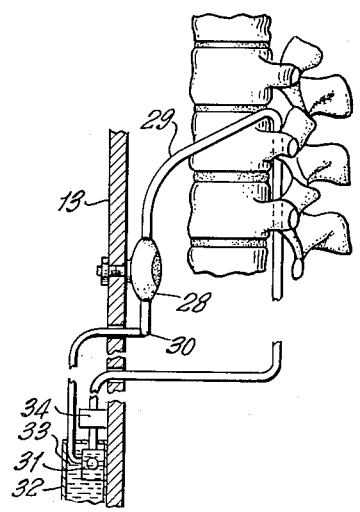

In the drawing:
FIGURE 1 is a front elevational view of one embodiment of the invention;
FIGURE 2 is a side elevational view of a portion of said embodiment of the invention showing a typical operative arrangement of the tubular members employed in said embodiment of the invention, this figure depicting said arrangement in conjunction with a model eye and a portion of the model spinal column.

As shown in the accompanying drawing, the said embodiment of the invention comprises a box or cabinet composed of half sections 10 and 11 hingedly connected, as at 12, and provided with an intermediate base member 13, which serves as a cover to one of said half sections 10 and which also serves as a support for the model anatomical elements hereinafter described. The box may be provided with a handle 14 whereby the entire unit, including the aforesaid half sections, cover and model anatomical elements may be conveniently carried, as desired.

At the top of the aforesaid intermediate member there is also provided a means for illumination, such as the electric lamp 15. The individual model anatomical members are mounted upon said intermediate member and below said lamp. Said model anatomical members include a model spinal column, generally designated by the numeral 16, and including a plurality of model vertebrae simulative of the natural vertebrae found in the human body. These model vertebrae support a model skull 17 which may be formed in an open position so as to expose a model brain 18, said brain and skull also being simulative to corresponding natural members found in the human body. A plurality of models of major organs of the human body, such as the lungs 18, the stomach 19, the intestines 20, the bladder 21, the heart 22, the liver 23 and gall bladder 24, the kidney 25, the ovaries 26 and the uterus 27, and the eye 28, are mounted in convenient positions upon said intermediate base member 13. Said models of the human organs are of hollow construction and are provided with flexible, transparent plastic tubular members. The connections to each of the models of the human organs are substantially similar and for the sake of illustration, the connection to one of such models, namely, the model of a human eye, will be described. As shown in FIGURE 2 of the drawing, said model of a human eye 28 is mounted upon the base member 13 and is connected to two of said transparent tubes or tubular members 29, 30 and each of said transparent tubular members is disposed through openings provided in the aforesaid model vertebrae in simulation of the opening provided for the emergence of the neural members or nerves from the spinal column found in the natural human organism, the said tubular members occupying positions simulative of the positions occupied by the nerves or neural members emerging from the human spinal chord and disposed in the vicinity of the human spinal column. Within the model vertebrae these tubular members are disposed in a position corresponding to that occupied by the human spinal chord. One of the tubular members 29 communicates with a manifold 34 connected to a circulating pump 31 which is conveniently mounted rearwardly of the intermediate base member 13 and is associated with a tank 32 provided with a quantity of a circulating medium, such as a red colored liquid 33, said pump operating to pump said liquid through manifold 34 and tube 29 into the hollow model organs, such as the model eye 28 shown in FIGURE 2 and back into the other of said tube 30 and thence back to the tank 32. Since the tubes are transparent, the circulation of said red fluid is readily apparent and will continue as long as the model vertebrae are disposed in their normal, healthy position so that the said tubes or tubular members are not subjected to any pressures or deformations which would interfere with such circulation of the fluid. However, when the vertebrae are manipulated in simulation of a deformation or dislocation thereof so as to exert pressure upon the tubes or tubular members emerging therefrom, the circulation of the fluid in said tubes or tubular members will be interfered with so as to substantially impair or, in extreme cases, to entirely interfere with said circulation, in which case the red fluid will disappear entirely from the tubes or tubular members 29, 30. In this way, it will become readily apparent, even to one unfamiliar with or unskilled in the science of chiropractic, that the deformation or dislocation of the vertebrae so interfering with a neural member will substantially impair the neural function of the organ associated with such neural member in the human body.

It will be noted that the aforesaid tubes or tubular members are constructed of a plastic material which is flexible and yieldable to the pressures which may be exerted thereon by the dislocation or deformation of the model vertebrae.

It will also be noted that the model brain 18 employed in the aforesaid embodiment of the invention is of hollow construction and connectable with the pump in a manner similar to that described above, so that the aforesaid circulating fluid will also communicate with the interior of said model brain. This member is preferably constructed of a translucent material, such as a translucent plastic, and hence, deformation of the model spinal column will also reflect itself in an impeded circulation of said fluid to the model brain. In this way, it will become readily apparent to the observer that the interferences resulting from spinal deformation and dislocation may reflect themselves in disturbances not only within the other major organs of the body, but also within the brain itself.

It will be apparent from the foregoing that the present invention is readily adapted to simple and graphic explanation of the effects of dispositions of the human spinal column in positions other than normal. When not in use, the circulating pump may be shut off and the circulating fluid either removed from the tank or retained therein by suitable valves, according to conventional practice, thereby permitting easy portability of the entire unit when the two half sections thereof are closed so as to contain the intermediate base member and the various elements of the invention mounted thereon.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

We claim:

1. An improved anatomical model comprising in combination, a column of model vertebrae arranged to simulate the natural spinal column, a plurality of tubular members communicating between said column of model vertebrae and at least one model of a human organ, said tubular members being formed of a transparent, flexible plastic material and provided with a fluid visible through said tubular members, means for circulating said fluid between said column of model vertebrae and said model of a human organ, the said model vertebrae being movable to compress said tubular members in simulation of compression upon neutral members emerging from the natural spinal column, the circulation of said fluid between said column of model vertebrae and said model of a human organ being impeded upon said compression of the tubular members, said model of a human organ being hollow and formed of a plastic material, said fluid entering and leaving said model of a human organ by way of said tubular members.

2. A device according to claim 1, the said fluid being colored, whereby its presence and flow through said tubular members is visible.

3. A device according to claim 1, the said tubular members being disposed in a position in the vicinity of said column of model vertebrae to simulate the position occupied by neural members in the vicinity of the natural spinal column.

4. An improved anatomical model comprising in combination, a column of model vertebrae arranged to simulate the natural human spinal column, said column of model vertebrae being surmounted by a model skull and brain in simulation of the natural human skull and brain, a plurality of models of the major organs of the human body composed of plastic and having a hollow conformation, the said model vertebrae, skull, brain and major organs of the human body being supported by a base member, the said column of model vertebrae housing at least two transparent plastic tubes which receive a colored fluid and communicate between a circulating pump provided with a manifold and mounted upon said base and at least one of the said model organs, whereby the colored fluid may be circulated to and from said circulating pump and model organ.

References Cited in the file of this patent

UNITED STATES PATENTS

| | | |
|---|---|---|
| 1,343,141 | Kenagy | June 8, 1920 |
| 1,581,736 | Hassler | Apr. 20, 1926 |
| 2,103,021 | Salsman | Dec. 21, 1937 |
| 2,537,573 | Conschafter | Jan. 9, 1951 |
| 2,871,579 | Niiranen et al. | Feb. 9, 1959 |